(12) United States Patent
Rozema et al.

(10) Patent No.: US 7,862,321 B2
(45) Date of Patent: Jan. 4, 2011

(54) MODULAR INJECTION MOLD AND MANIFOLD ARRANGEMENT

(75) Inventors: Henry John Rozema, Brampton (CA); Robert Frank Rick, Toronto (CA); Antonio Morrone, Woodbridge (CA)

(73) Assignee: StackTeck Systems Limited (CA)

( * ) Notice: Subject to any disclaimer, the term of this patent is extended or adjusted under 35 U.S.C. 154(b) by 630 days.

(21) Appl. No.: 11/881,042

(22) Filed: Jul. 25, 2007

(65) Prior Publication Data

US 2008/0026096 A1 Jan. 31, 2008

(30) Foreign Application Priority Data

Jul. 26, 2006 (CA) .................................. 2553563

(51) Int. Cl.
 *B29C 45/00* (2006.01)
 *B28B 17/00* (2006.01)

(52) U.S. Cl. .................. 425/192 R; 425/234; 425/572; 425/588; 425/564

(58) Field of Classification Search ................. 425/234, 425/572, 588, 190, 192 R, 562, 564
 See application file for complete search history.

(56) References Cited

U.S. PATENT DOCUMENTS 4,416,604 A * 11/1983 Bender et al. ............... 425/183
5,846,472 A * 12/1998 Rozema et al. .......... 264/297.2

* cited by examiner

*Primary Examiner*—Maria Veronica D Ewald
(74) *Attorney, Agent, or Firm*—Harness, Dickey & Pierce, P.L.C.

(57) ABSTRACT

A molding arrangement is provided for multi-level stack molds wherein mold sets and runners are made up of modular sections interchangeable individually or as larger assemblies for exchanging molds for one part for those for different parts or exchanging runners between hot tip and valve gate designs to accommodate different molding arrangements. The arrangement has discrete melt paths for each mold level, at least some of which extend around rather than through the mold levels and which incorporate readily separable connectors. This enables one set of molds and possibly as well the runners for one mold level to be interchanged without interfering with the mold and runner arrangement for an adjacent level.

19 Claims, 17 Drawing Sheets

MODULAR INJECTION MOLD AND MANIFOLD ARRANGEMENT

FIELD OF THE INVENTION

This invention relates generally to injection molding apparatus. More particularly this invention relates to multi-level stack molds having hot runner systems. Still more particularly this invention relates to exchanging mold and runner systems to produce different parts on a given injection molding machine.

BACKGROUND OF THE INVENTION

"Family molding" is a term used to refer to the molding of different parts in a given mold set. In the case of stack molds, different parts may be produced on different levels. Sometimes, although not exclusively so, the parts may form components of a larger assembly, such as a container and its lid.

A common arrangement for delivering melt to a mold is referred to as a "hot runner system". Two variants of hot runner systems are "valve gate" hot runners and "hot tip" hot runners. Either uses a nozzle to introduce melt into a gate which provides an inlet to a space defined between core and cavity parts of a mold. A valve gate system has a retractable valve pin extending axially along the nozzle into the gate for opening and closing the gate.

A hot tip system controls the temperature of a nozzle tip which registers with the gate to control melt flow. Heat is removed to solidify melt in the tip thereby blocking the tip. Heat is added to remelt the solidified melt and recommence melt flow through the nozzle.

Valve gated systems have a lower shear rate at the gate providing more gentle flow. Valve gated systems are however more expensive and wear prone than hot tip systems.

One application for hot runner systems is in what is aptly named as "in mold labelling" or "IML". In IML, one or more labels is/are placed into a mold cavity prior to mold closing. The mold is subsequently closed and melt injected to cause the label to fuse into the melt and appear on the outer face(s) of a finished part.

In some applications, one face or side (typically the bottom face or side) may not require a label. For a rectangular container this may be referred to as "four-sided labelling". In other applications labels will be required on all sides or faces which, in the case of a rectangular container may be referred to as "five-sided labelling". The terms "four-sided" and "five-sided" are used herein for convenience bearing in mind that the challenges posed by either also translate into other container configurations. For example a conical or cylindrical container may have one wraparound label (analogous to four sides) and may or may not have a label requited on its bottom or base (analogous to the "fifth" side). Also, containers with other shapes may be contemplated. Furthermore labels may be desired on the "bottom" face or side but not on all of the adjoining sides (such as in "three-sided" labelling).

In general, hot tip arrangements don't work well in IML situations where a label is present opposite to the nozzle, such as in a three or five-sided label for a rectangular container having a label and a melt entry point on its base. Generally in such situations the melt would damage the label and get past the edges of the label to mask its face. Hot tip arrangements however work well for three or four-sided labelling of a similar container with no label on its base.

According to traditional mold design, molds and runner systems were designed as a dedicated set and changing from one part configuration to another required in effect replacing virtually everything between the fixed and movable platens of the injection molding machine. Furthermore, changing parts also required changing any mold take-off arrangements (such as robotics) as a new set would be unlikely to discharge parts in a location similar to the previous set.

In order to make parts economically with dedicated mold and runner arrangements, a rather significant production run would be required. Dedicated systems are expensive to build and significant downtime is required to effect changeover. The associated costs for using dedicated arrangements will make molding in some markets uneconomical because the volume won't justify the cost.

Consider for example a rectangular container and lid as a family mold. The same container may be desired by different customers for different products. The different customers will have different labelling requirements, not only graphically but also as to whether or not all of the faces of the containers are to be labelled. Accordingly, situations may arise where the same general container shape may require valve gated runners or hot tip runners depending on labelling requirements. Furthermore a common lid may be usable with different containers. In order to serve such markets with minimal capital investment, versatile mold arrangements are required.

It is an object of the present invention to provide a molding arrangement wherein different mold sets may be readily interchanged without changing runner systems and wherein at least portions of a runner system may be readily interchanged between hot tip and valve gate designs in order to effect corresponding mold changes such as may be required for different labelling requirements.

SUMMARY OF THE INVENTION

The invention, in very general terms provides a molding arrangement for multi-level stack molds wherein mold sets and runners are made up of modular sections interchangeable individually or as larger assemblies for exchanging molds for one part for those for different parts or exchanging runners between hot tip and valve gate designs to accommodate different molding arrangements. The arrangement has discrete melt paths for each mold level, at least some of which extend around rather than through the mold levels and which incorporate readily separable connectors. The melt paths can be configured to accommodate different materials. This enables one set of molds and possibly as well the runners for one mold level to be interchanged without interfering with the mold and runner arrangement for an adjacent level.

More particularly a modular injection mold and manifold is provided for a multi-level stack mold assembly mountable between a stationary platen and a fixed platen of an injection molding machine wherein the stationary platen has at least one sprue bushing providing at least first and second melt sources. The arrangement includes a first manifold module mountable to the stationary platen and providing a first melt distribution conduit for receiving melt from the first melt source and delivering it to a first nozzle array associated with a first mold level of the multi-level stack mold assembly. The first mold level includes a first mold module having a first core part, first cavity part for registering with the first core part and respective gates registering with each nozzle of the first nozzle array for injecting the melt into a space defined between the first core and cavity parts in a mold closed configuration. The second manifold module is mountable between the movable platens for movement toward and away from the fixed platens and includes a second melt distribution conduit for receiving melt stationary and from the second melt source and delivering the melt to a second nozzle array associated with a second mold level of the multi-level stack mold assembly. The second mold level includes a second mold module having a second core part, a second cavity part for registering with a second core part and respective gates registering with each nozzle of the nozzle array for injecting the melt into a space defined between the second core and cavity parts in the mold closed configuration.

The first and second core and cavity parts are separable in a machine direction to a mold open configuration for stripping and are connectable to the stationary and movable platens for movement between the mold open and mold closed configurations.

The first and second manifold modules are configured to divert melt around rather than through the first mold module to allow the first mold module to be interchanged as a unit for a first mold module for a different part having corresponding gate positions. The first manifold module is disconnectable at the sprue bushing from the stationary platen to facilitate exchange of a given first manifold module for another first manifold module of different configuration for a different first mold module. The second manifold module receives melt from the second source through a second melt delivery conduit at least a portion of which runs through the first manifold module and which is separable along its length for mold opening and to allow exchange of the second manifold module for one of different configuration. The second mold module is removable from the second manifold module without disassembly of the second manifold module to allow exchange of one second mold module for another configured for a different part but having corresponding gate positions.

The first manifold module may include a first part having a first manifold and being securable to the fixed platen and a second part having a second manifold to which the nozzle array is affixed. The first mold module may be mounted between the first and second parts. The first and second manifolds may fluidly communicate through a first melt transfer conduit having a crossover nozzle for allowing the transfer passage to separate during mold opening.

The first nozzle array may consist of valve gated nozzles and the second nozzle array may consist of one of valve gated and hot tip nozzles.

The first manifold may receive melt from the first and second melt sources. The first manifold may also have a first melt passageway providing fluid communication between the first melt source and the first melt delivery conduit. The first manifold may have a second melt passageway which acts as a first run of the second melt delivery conduit and provides fluid communication between the second melt source and a second run of the second melt delivery conduit. The second manifold may provide fluid communication between the first melt delivery conduit and the first nozzle array.

The second manifold module may include a third manifold to which the second array of nozzles is affixed and which provides fluid communication between the second run of the second melt delivery conduit and the second nozzle array. The second run of the second melt delivery conduit may include a crossover nozzle for providing the separability along its length.

The first manifold module may have a first manifold secured to the fixed platen. The first nozzle array may be affixed to the first manifold and the first nozzle array may consist of hot tip nozzles. The first manifold may have a first melt passageway providing fluid communication between the first melt source and the first nozzle array. The first manifold may include a second melt passageway which acts as a first run of the second melt delivery conduit and provides fluid communication between the second melt source and the second run of the second melt delivery conduit.

The second nozzle array may consist of one of valve gated nozzles and hot tip nozzles. The second manifold module may include a third manifold to which the second nozzle array is fixed. The second manifold module may include guide means for slidably mounting the second manifold module to injection machine rails for slidably supporting the second manifold module during mold opening and closing. The core part of the first mold module may be secured to the second manifold module by a spacer plate extending therebetween. Support pins may extend from the spacer plate through and slidably engage the first core and cavity parts to align the first core and cavity parts. The first mold module and the spacer plate may be dimensioned for withdrawal between machine tie bars for exchange with corresponding components configured for molding a different injection molded part without disturbing the tie bars.

Additionally the first mole module, spacer plate and the first manifold module may be dimensioned for withdrawal as a unit between the tie bars.

The second manifold module may include guide means for slidably mounting the second manifold module to injection machine rails for slidably supporting the second manifold module during mold opening and closing. The second part of the first manifold module may be secured to the second manifold module and supported thereby. Support pins may extend from the second manifold module through and slidably engage the first core and cavity parts to align the first core and cavity parts. The first mold module and at least the first part of the first manifold module may be dimensioned for withdrawal between the tie bars for exchange with corresponding components configured to form a different injection molded part.

DESCRIPTION OF DRAWINGS

Preferred embodiments of the present invention are described below with reference to the accompanying illustrations in which.

DESCRIPTION OF PREFERRED EMBODIMENTS

Figure 1:
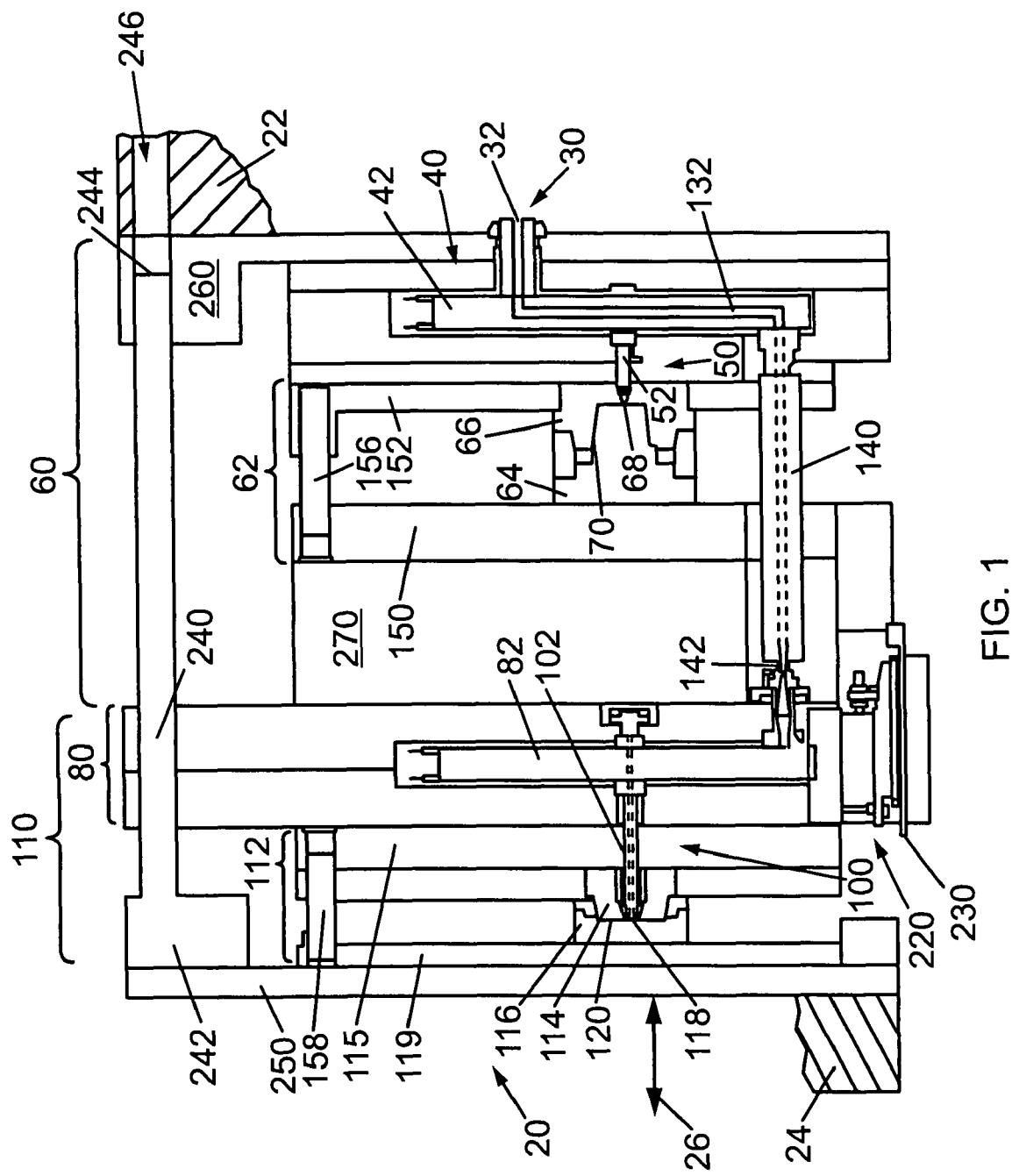
FIG. 1 is a front elevation illustrating schematically a first injection mold and manifold arrangement according to the present invention having a hot tip nozzle arrangement in a first mold level and a valve gated nozzle arrangement in a second mold level.
Figure 2:
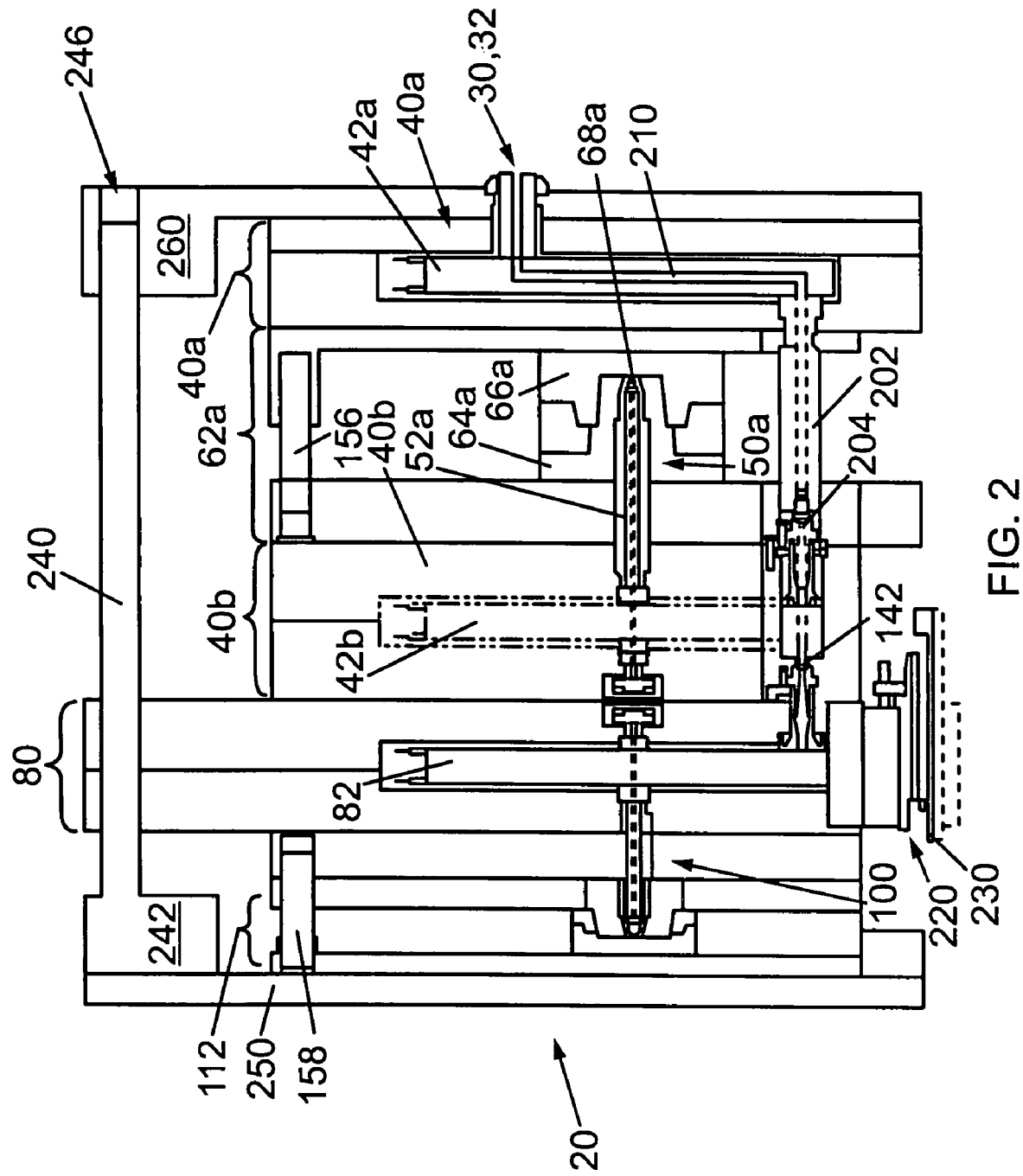
FIG. 2 is a view corresponding to FIG. 1 of a modular injection mold and manifold arrangement according to the present invention in which both first and second levels have valve gated nozzles.

A modular injection mold and manifold arrangement according to the present invention is generally indicated by reference 20 in FIGS. 1 and 2. The arrangement 20 is mountable between a stationary or fixed platen 22 and a movable platen 24 of an injection molding machine. The injection molding machine is not illustrated other than for scrap sections showing the relative positions of the stationary platen 22 and a movable platen 24 in FIG. 1. The movable platen 24 is movable toward and away from the fixed platen 22 in a machine direction as illustrated by arrows 26 in FIG. 1. The injection molding machine provides first and second discrete melt sources 30 and 32 respectively. The first melt source 30 may be behind the second melt source 32 in a single sprue bushing as illustrated in FIG. 1. Alternatively, two sprue bushings could be used to enable a different material to be used for each mold level.

Figure 6:
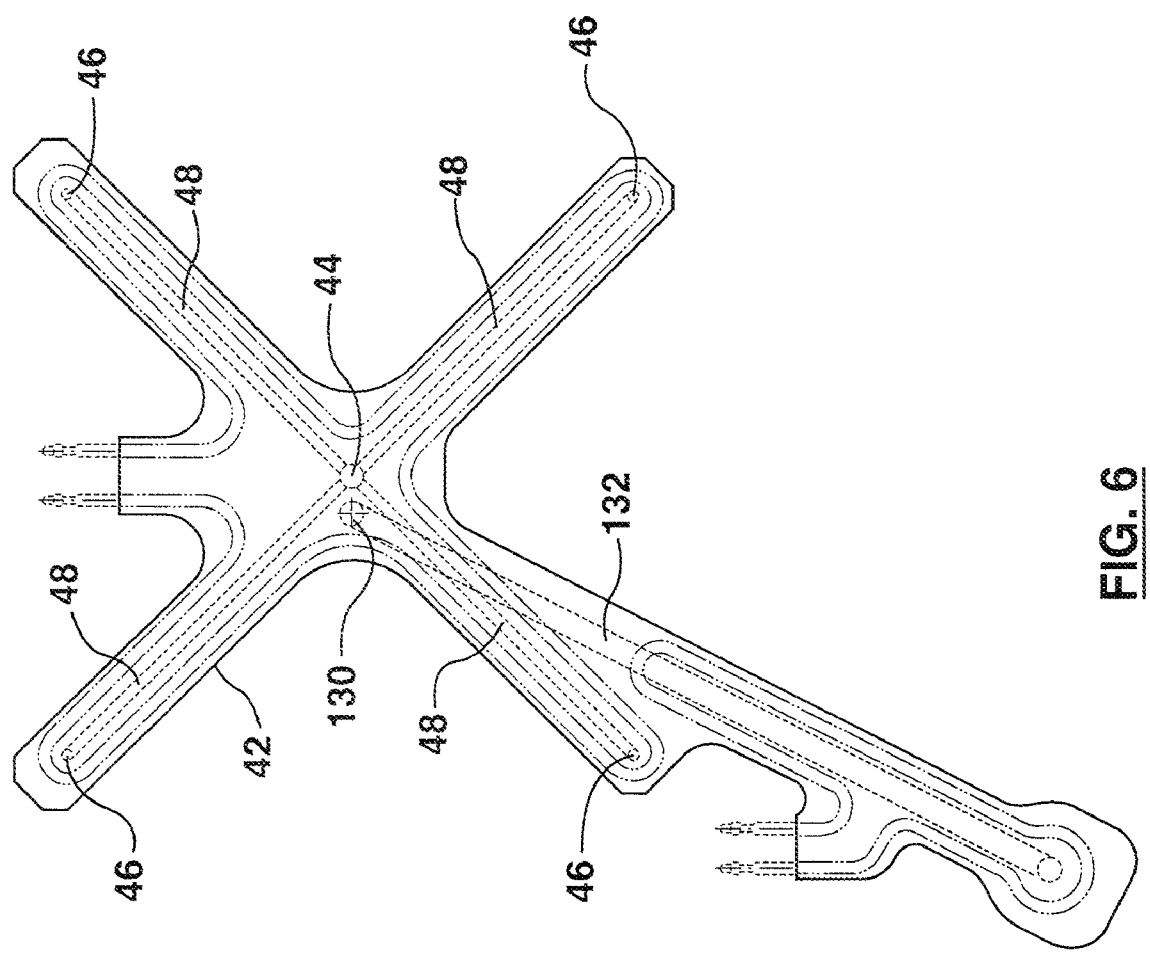
FIG. 6 is an end elevation schematically illustrating the manifold arrangement associated with the first mold level.
Figure 7:
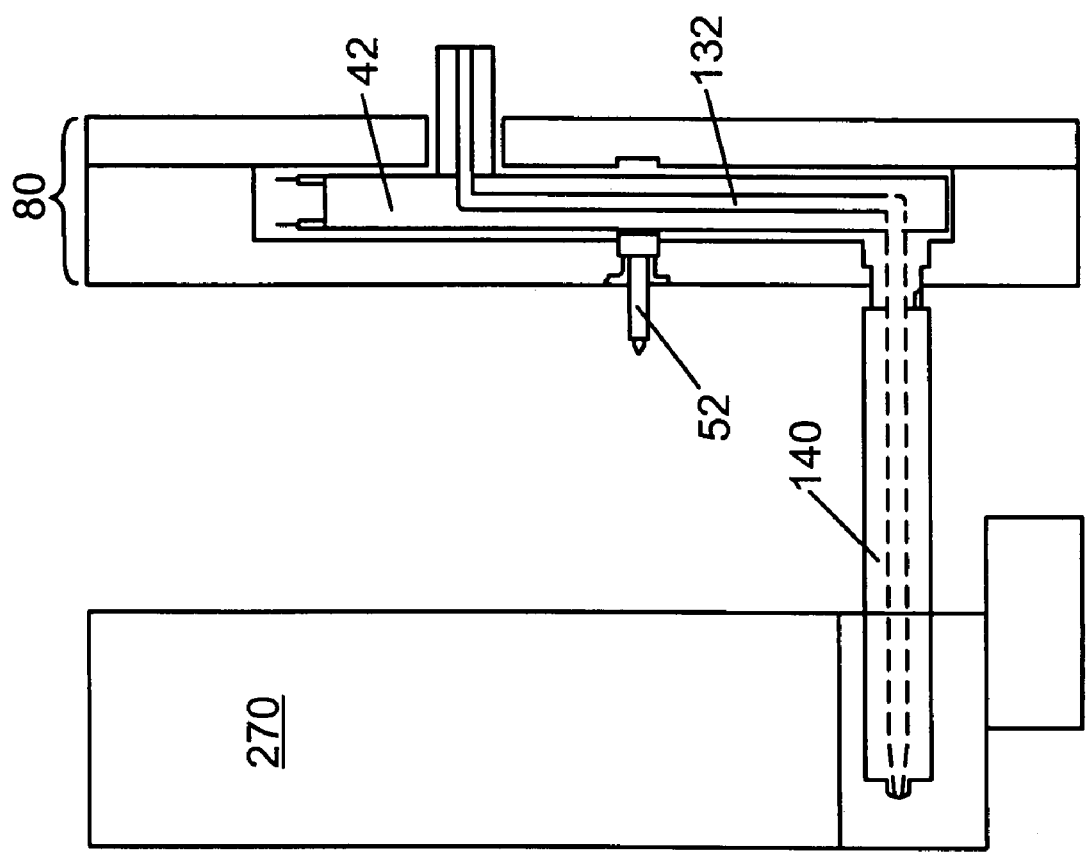
FIG. 7 is a front elevation schematically illustrating a hot tip frame module according to the present invention

A first manifold module or "set" 40 is mountable to the stationary platen 22. FIG. 7 illustrates the first manifold module 40 on its own. The first manifold module 40 includes a first manifold 42 secured to the stationary platen 22. As discussed in more detail below, the mounting may be to a first frame member 260 which in turn is mounted to the stationary platen 22. The first manifold 42 is illustrated in FIG. 6. The first manifold 42 has a first inlet 44 for registering with the first melt source 30 and four outlets 46 fluidly communicating with the first inlet 44 in a first melt passageway 48 extending therebetween. A respective nozzle 52 of a first nozzle array 50 would receive melt from each outlet 46 of the first manifold 42.

It will be appreciated that having four outlets 46 to the first manifold 42 is exemplary. More or less may be provided as needed. In order to balance melt flow preferably (as illustrated in FIG. 6) the first melt passageway 48 will be configured in equal length runs extending radially from a central inlet 44.

The first inlet 44, outlets 46 and passageway 48 provide a first melt distribution conduit for receiving melt from the first melt source 30 and delivering it to the first nozzle array 50. The arrangement illustrated in FIG. 1 is configured for hot tip nozzles. As discussed in more detail below, the first manifold module may alternately be configured for valve gated nozzles.

The first nozzle array 50 feeds a first mold level 60. The first mold level 60 includes a first mold module 62 having a first core part 64, a first cavity part 66 registering with the first core part 64 and respective gates 68 registering with each nozzle 52 of the first nozzle array 50. The gates 68 provide a path for the injection of melt from the nozzles 52 into respective spaces 70 defined between the first core part 64 and first cavity part 66 when held together in a mold closed configuration as illustrated in FIG. 1.

Figure 8:
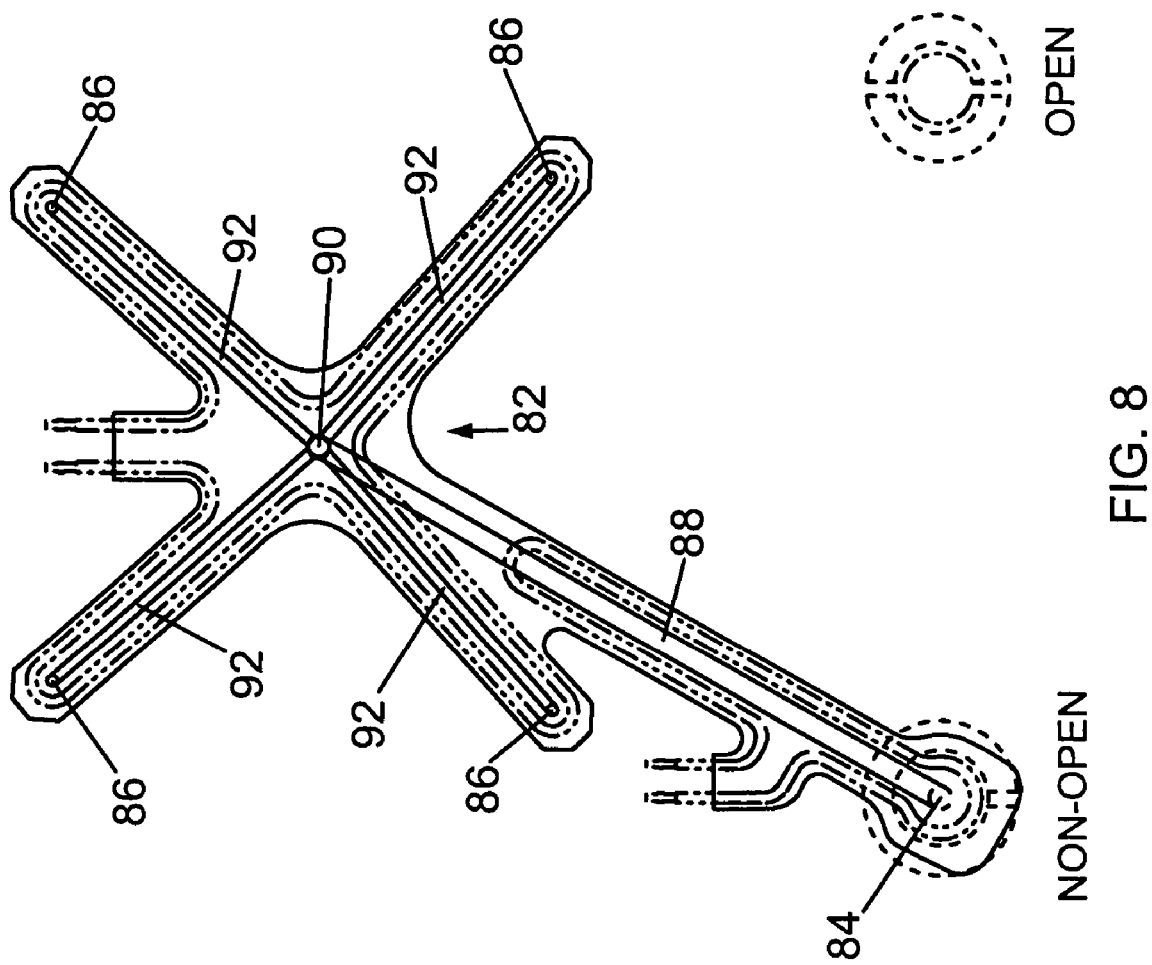
FIG. 8 is an end elevation schematically illustrating a manifold arrangement associated with the second mold level.
Figure 9:
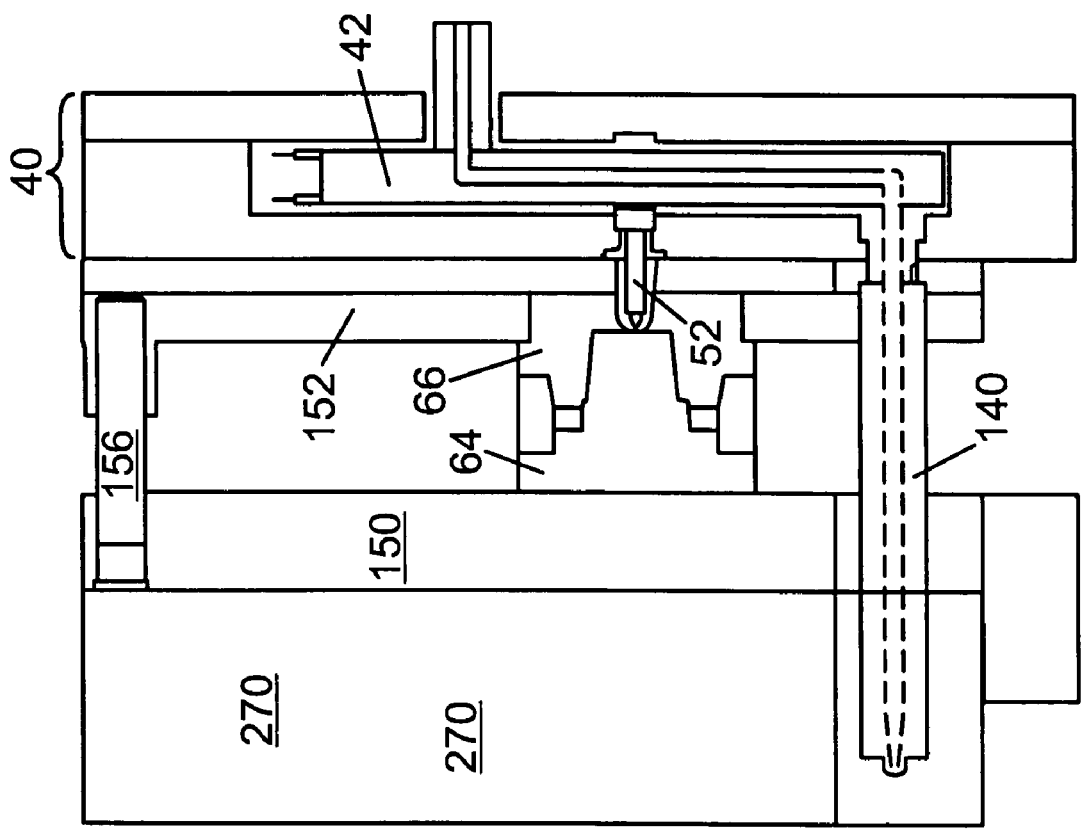
FIG. 9 is a front elevation of a hot tip frame module with a stack mold module installed.

A second manifold module 80 is mounted between the stationary platen 22 and the movable platen 24. The second manifold module 80 includes a third manifold 82 which is illustrated in FIG. 8. The third manifold 82 has an inlet 84 for receiving melt originating from the second melt source 32 and four outlets 86 fluidly communicating with the inlet 84 of the third manifold 82 through a second melt distribution conduit extending therebetween. The melt distribution conduit is illustrated as comprising a first leg 88 which extends to a central region 90 where it branches into four radially extending equal length legs 92. Each leg 92 terminates in a respective outlet 86 each of which would serve a respective nozzle 102 of a second nozzle array 100. As described above with respect to the first manifold, this is an illustration of one arrangement. More or less legs may be provided depending on the mold/nozzle configuration required.

The second nozzle array 100 feeds a second mold level 110. The second mold level 110 includes a second mold module 112 having a second core part 114 and a second cavity part 116 and respective gates 118 registering with each nozzle 102 of the second nozzle array 100. The respective gates 118 provide a path for the injection of melt from the nozzles 102 into respective spaces 120 defined between the second core part 114 and the second cavity part 116 when held together in a mold closed configuration as illustrated in FIG. 1.

In the embodiment/arrangement illustrated in FIG. 1, the first nozzle array 50 consists of hot tip nozzles which fill a container mold from its outside. Also in the FIG. 1 illustration, the second nozzle array 100 consists of valve gated nozzles for filling a container lid mold from its inside. Such an arrangement would accord with a container having four sided labelling (i.e. no bottom label) and a container lid having a label on its upper face.

The first manifold module 40 receives melt from the first melt source 30 as discussed above. The first manifold module 40, and in particular the first manifold 42 also receives melt from the second melt source 32 through a second inlet 130 in FIG. 6. The first manifold 42 has a second melt passageway 132 which extends from and fluidly communicates with the second inlet 130. The second melt passageway 132 is a first run of a second melt delivery conduit.

The second melt passageway 132 directs melt radially outwardly from the second inlet 130 to a second run 140 of the second melt delivery conduit which extends generally parallel to the machine direction. The second run 140 extends between the second melt passageway 132 and the third manifold 82. The second melt delivery conduit, consisting of the first run (i.e. the second melt passageway 132) and the second run 140, provides fluid communication between the second melt source 32 and an inlet 84 of the third manifold 82.

Figure 3:
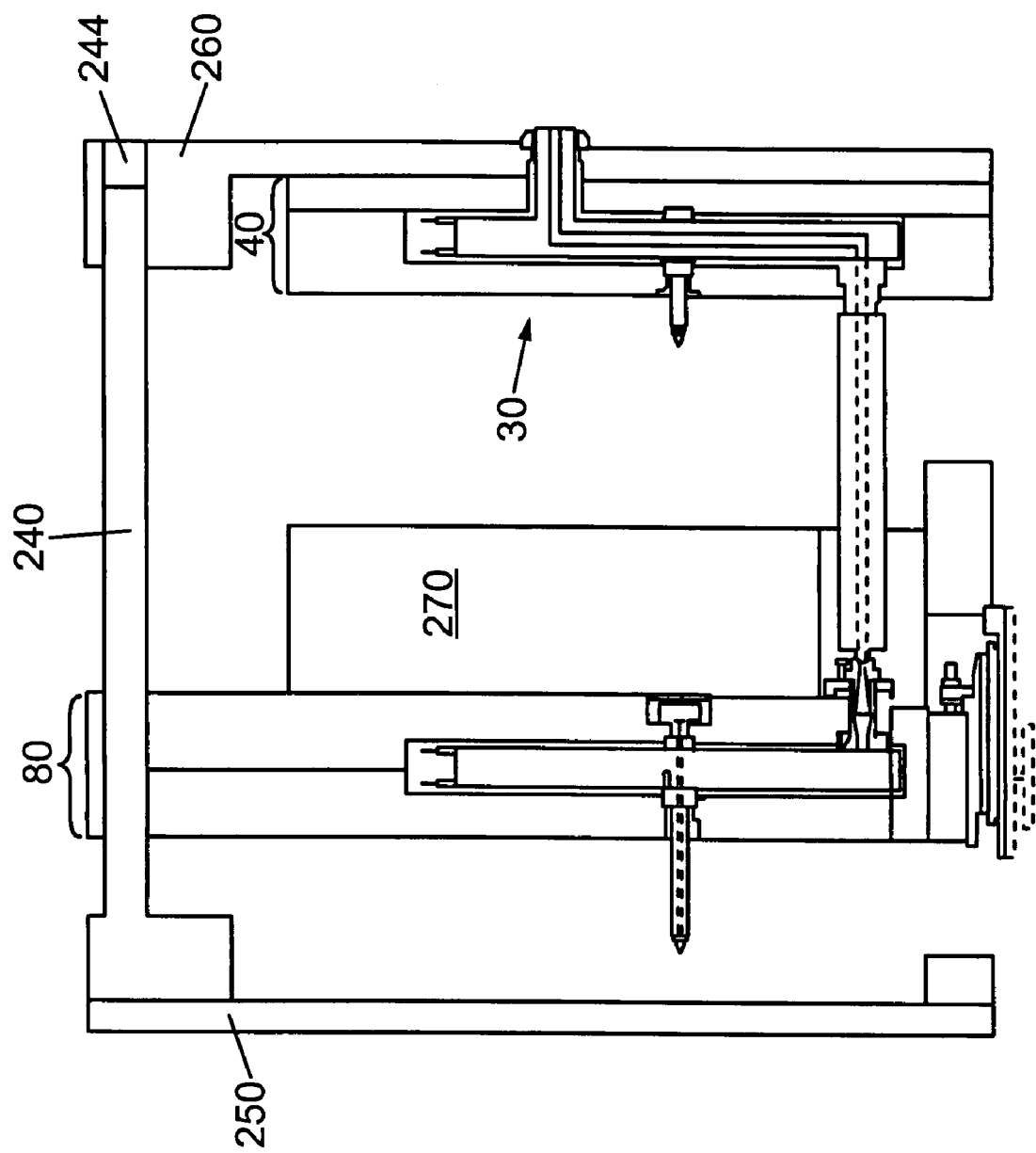
FIG. 3 is a view corresponding to FIG. 1 without the first and second mold levels in place.
Figure 4:
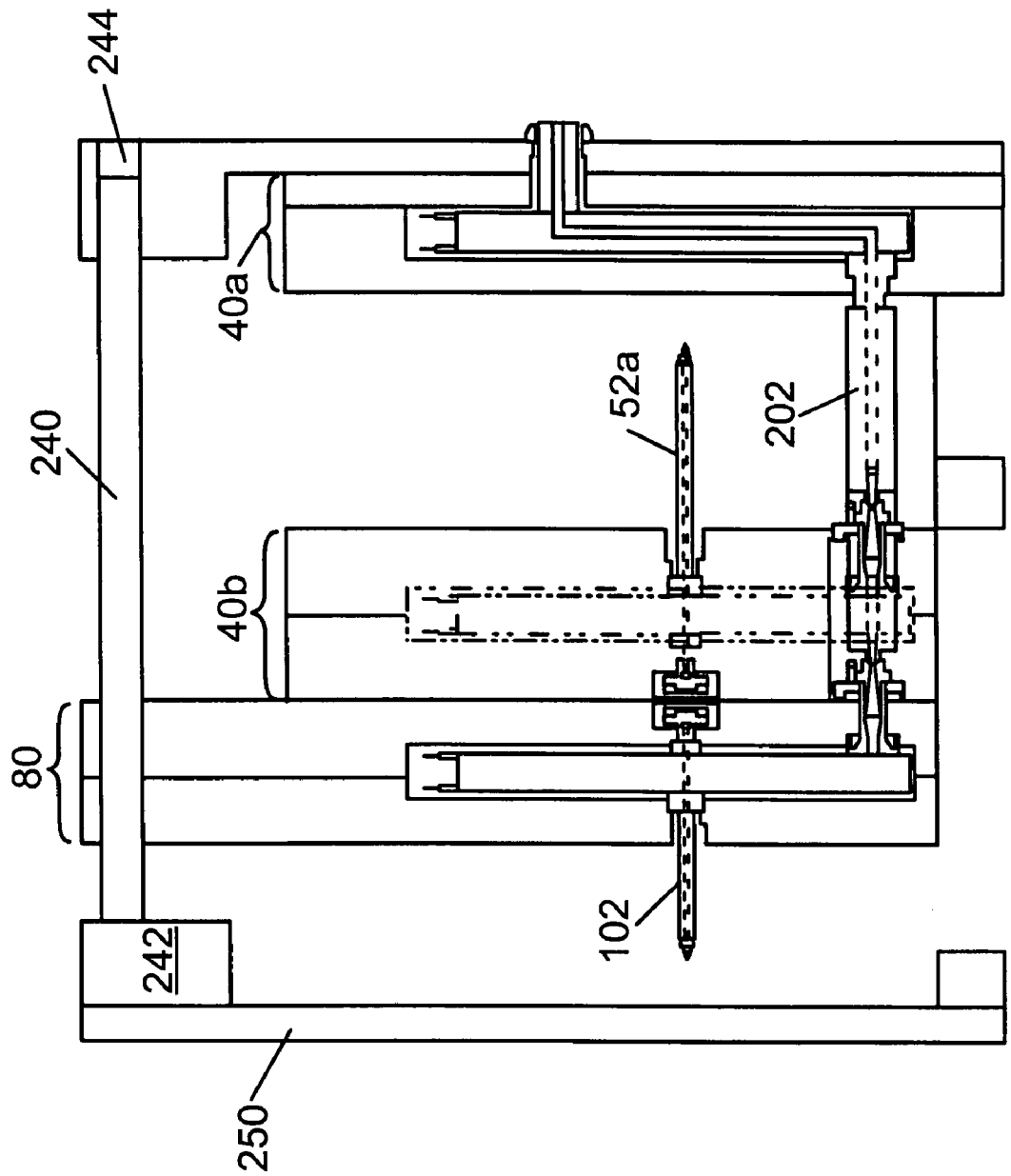
FIG. 4 is a view corresponding to FIG. 2 without the first and second mold levels in place.
Figure 5:
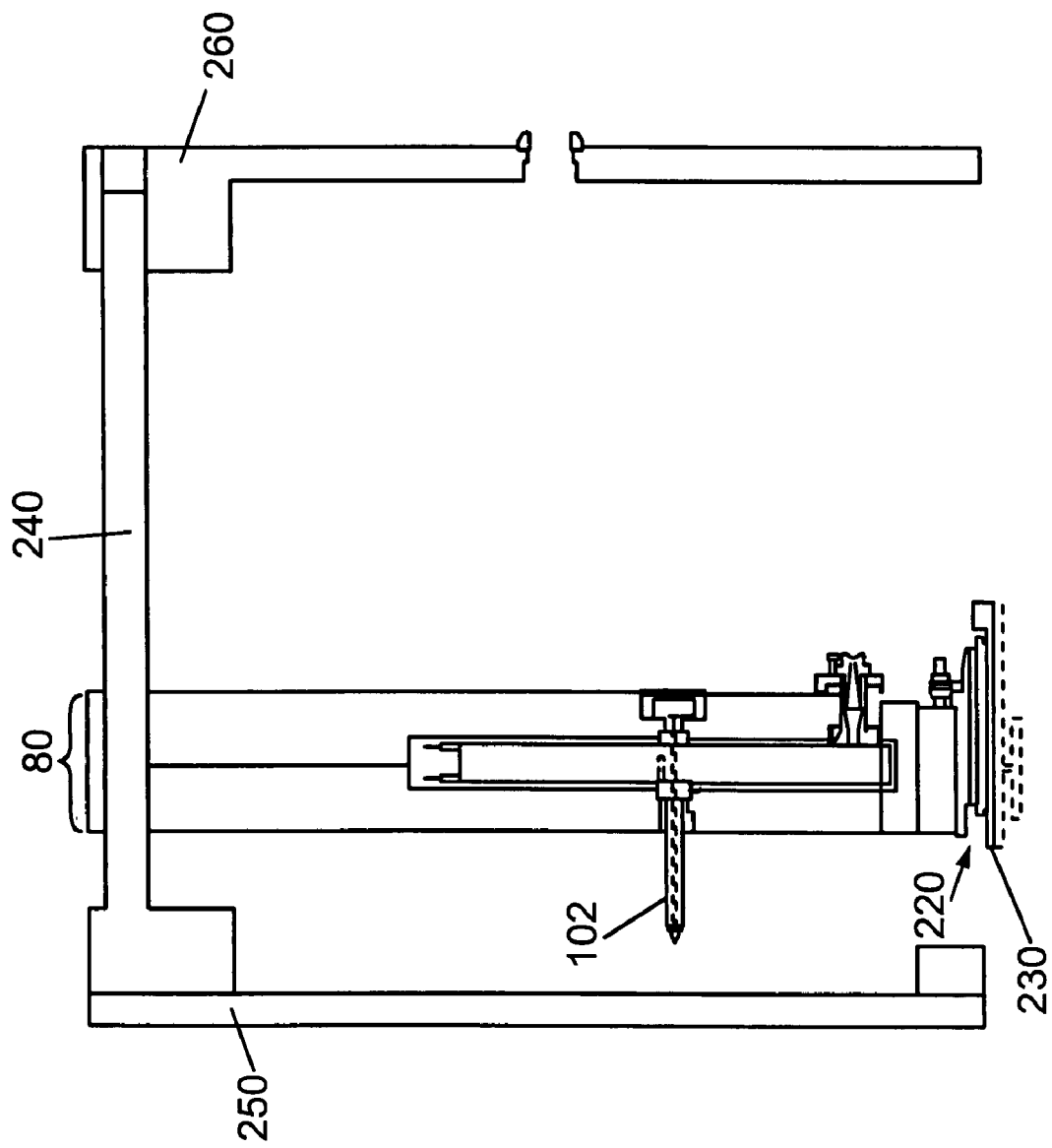
FIG. 5 is a view corresponding to FIGS. 1 and 2 but illustrating only the manifold and nozzle array arrangement associated with the second mold level.

The first manifold module 40 and the second manifold module 80 are configured to divert melt around rather than through the first mold module 62. This is achieved, as described above, by having the second melt passageway 132 (the first run of the second melt distribution conduit) extend radially, which is transverse to the machine direction and therefore around rather than through the first mold module 62. This enables substitution of the first mold module 62 for another without interfering with melt delivery to the second manifold module 80. FIG. 3 illustrates the arrangement of FIG. 1 absent the first mold module 62 and second mold module 112.

In order to accommodate mold opening and closing, the second run 140 of the second melt delivery conduit is separable along its length by virtue of a crossover nozzle 142 where the second run 140 meets the inlet 136 of the third manifold 82. One suitable form of crossover nozzle is as described in International Publication Number WO 2005/046960 A1.

Figure 10:
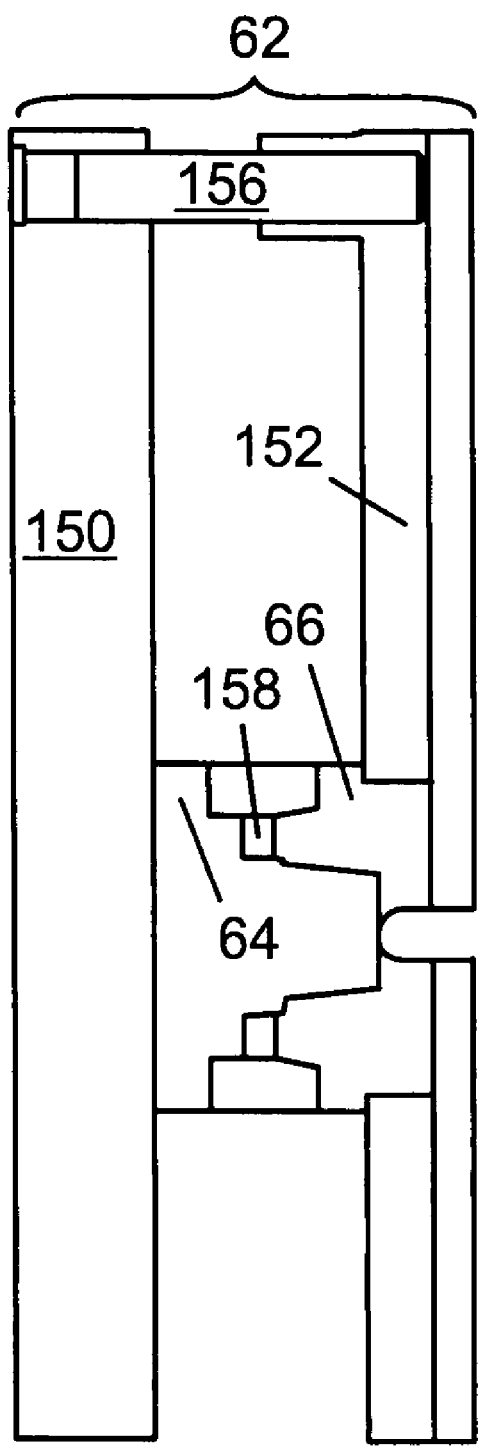
FIG. 10 is a front elevation of the stack mold module of FIG. 9.
Figure 11:
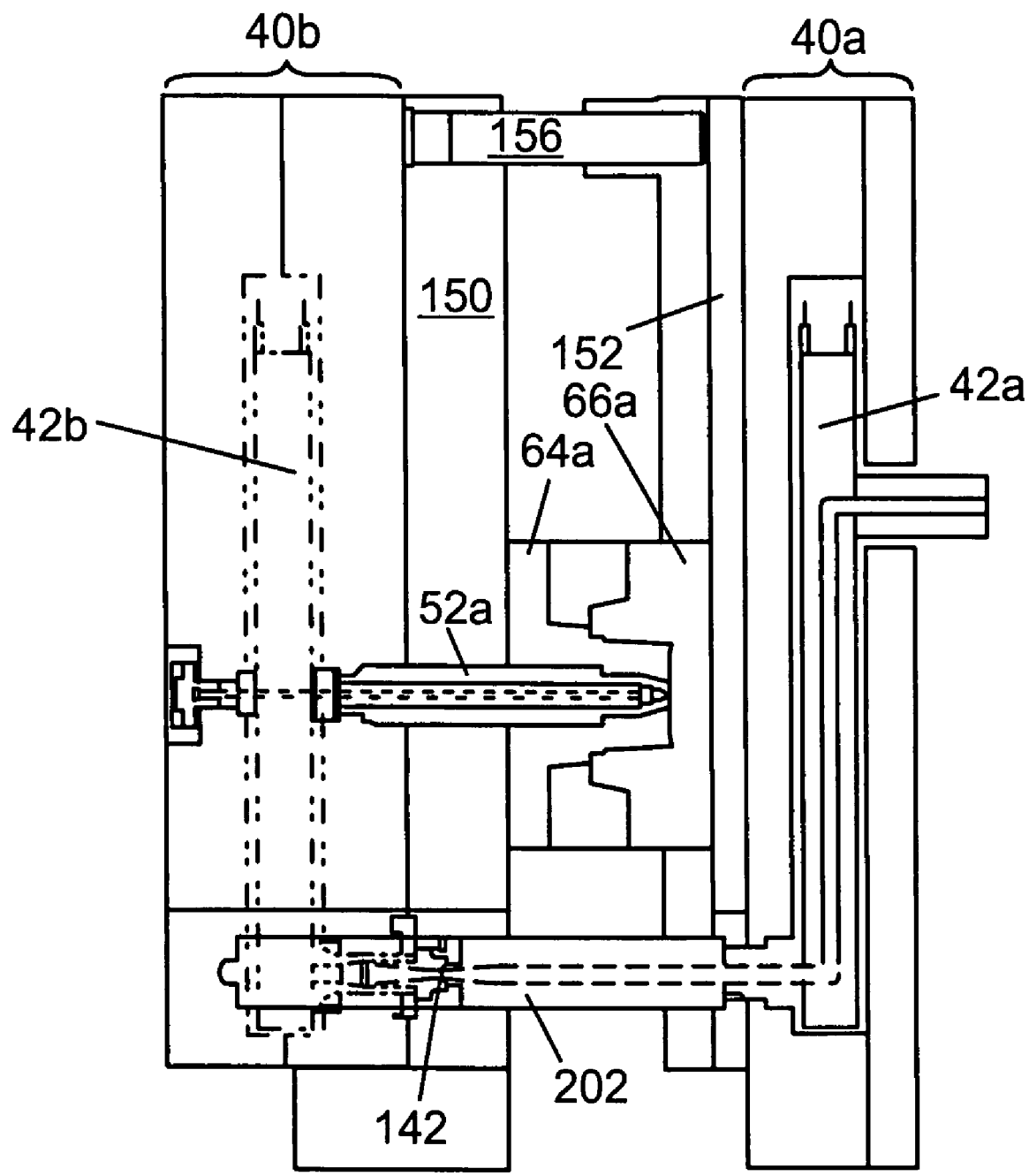
FIG. 11 is a front elevation of a valve gate frame module with a stack module installed.
Figure 12:
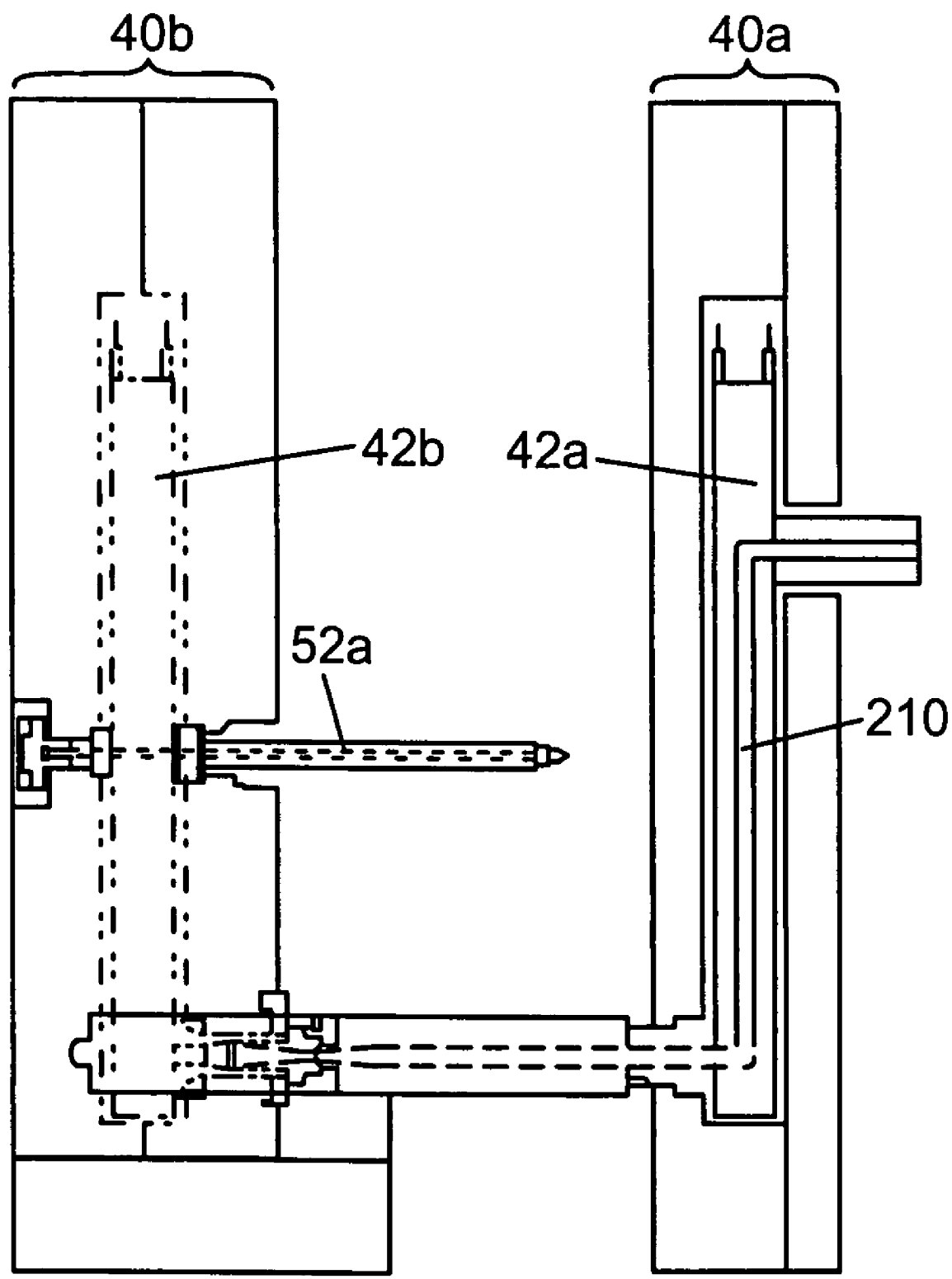
FIG. 12 is a front elevation of the valve gate frame module of FIG. 11 without the stack module installed.

FIG. 10 illustrates on its own the first mold module 62 of the type in FIG. 1 in which a core plate 150 carries the cores 64 and a cavity plate 152 carries the cavities 66 (only one of each are illustrated). In order to maintain precise alignment and to hold the core plate 150 and cavity plate 152 aligned when removed, guide pins 156 are provided which extend from the core plate 150 and are slidably received in the cavity plate 152. A stripper ring 158 may also be provided about a base of the cores 64 for stripping finished parts therefrom in known arrangement. A stripper plate (not shown) may be used to carry the stripper rings 158.

It will be appreciated that any substitution of a given first manifold module 62 for another first mold module 62 will have to be for a first mold module 62 requiring similar nozzle positions and requiring similar take-off robotics as otherwise the gates 68 won't align with the nozzles 52 and the parts formed won't align with the take-off equipment. Whilst this may impose some practical limitations, it nevertheless provides very fast part changeover as compared to earlier designs requiring substantial disassembly of virtually everything between the stationary platen 22 and movable platen 24.

In a similar manner, the second mold module 112 is removable from between the second manifold module 80 and the movable platen 24 without disassembly of the second manifold module 80. In this manner a different second mold module 112 may be substituted as long as its gates correspond in their respective positions. As mentioned above, FIG. 3 illustrates the manifold arrangement of FIG. 1 absent the second mold module 112.

As with the first mold module 62 the core part 114 may be carried by a core plate 115 and the cavity part 116 by a cavity plate 119. A pair of guide pins 158 may extend from upper corners of the cavity plate 119 to be slidably received in the core plate 115. The guide pins 158 keep the core part 114 and cavity part 118 aligned to facilitate removal as a modular unit.

Should a more substantial change be desired, the entire first manifold module 60 may be substituted for a different one. The substitution may even be one of exchanging a hot tip arrangement such as illustrated in FIG. 1 for a valve pin arrangement such as illustrated in FIG. 2. In FIG. 2, analogous components to those described above are identified by like reference numerals but followed by the suffix "a", and the above description applies with the variations described below.

In the arrangement illustrated in FIG. 2, a second part 40b to the first manifold module is provided on an opposite side of the mold module 62a from a first part 40a containing a first manifold 42a. The first nozzle array 50a is affixed to a second manifold 42b associated with the second part 40b and comprises valve gate nozzles 52a.

The first manifold 42a is of different configuration than the first manifold 42 described above and is described in more detail below. The first manifold 42a and the second manifold 42b fluidly communicate through a first melt transfer conduit 202 which forms part of the overall first melt delivery conduit and which includes a second crossover nozzle 204 to allow its separation during mold opening.

Figure 13:
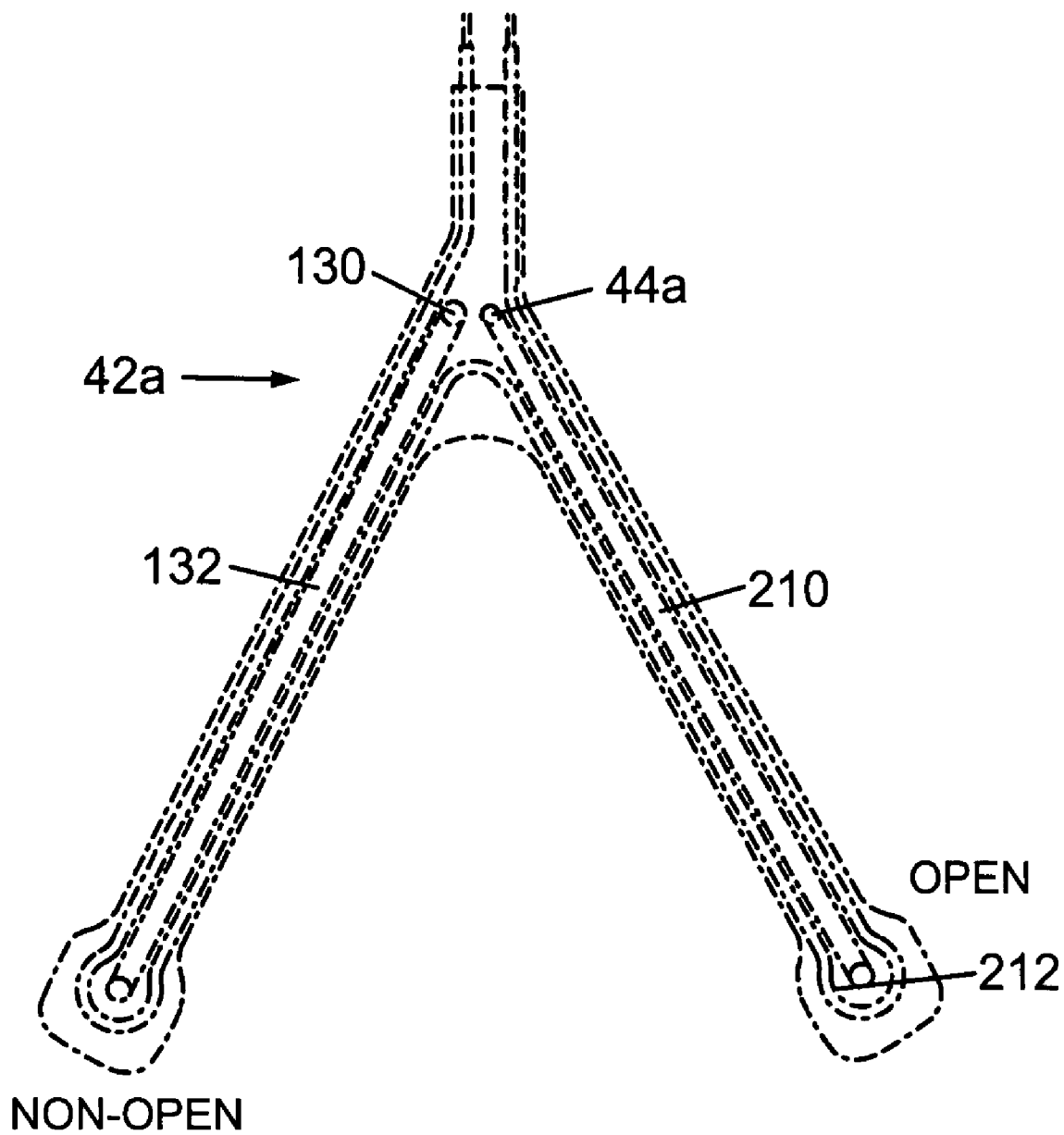
FIG. 13 is an end elevation illustrating a first part of a first manifold assembly corresponding to the FIG. 2 arrangement.

FIG. 13 illustrates the first manifold 42a of the FIG. 2 embodiment. The first manifold has a first inlet 44a for receiving melt from the first melt source 30. The first manifold 42a also has a second inlet 130 for receiving melt from the second melt source 130. The first manifold 42a has a second melt passageway 132 similar to that described above for providing fluid communication between the second melt source and the second run 140 of the second melt delivery conduit.

The first manifold 42a differs from the first manifold 42 described above in that it simply ducts melt around the first mold module 62a rather than directly feeding the first nozzle array 50a. The first manifold 42a has a first melt passageway 210 which is part of the first melt delivery conduit and which receives melt from the first melt source through the inlet 44a and delivers the melt to an outlet 212. The outlet 212 fluidly communicates with the first melt transfer conduit 202.

Figure 14:
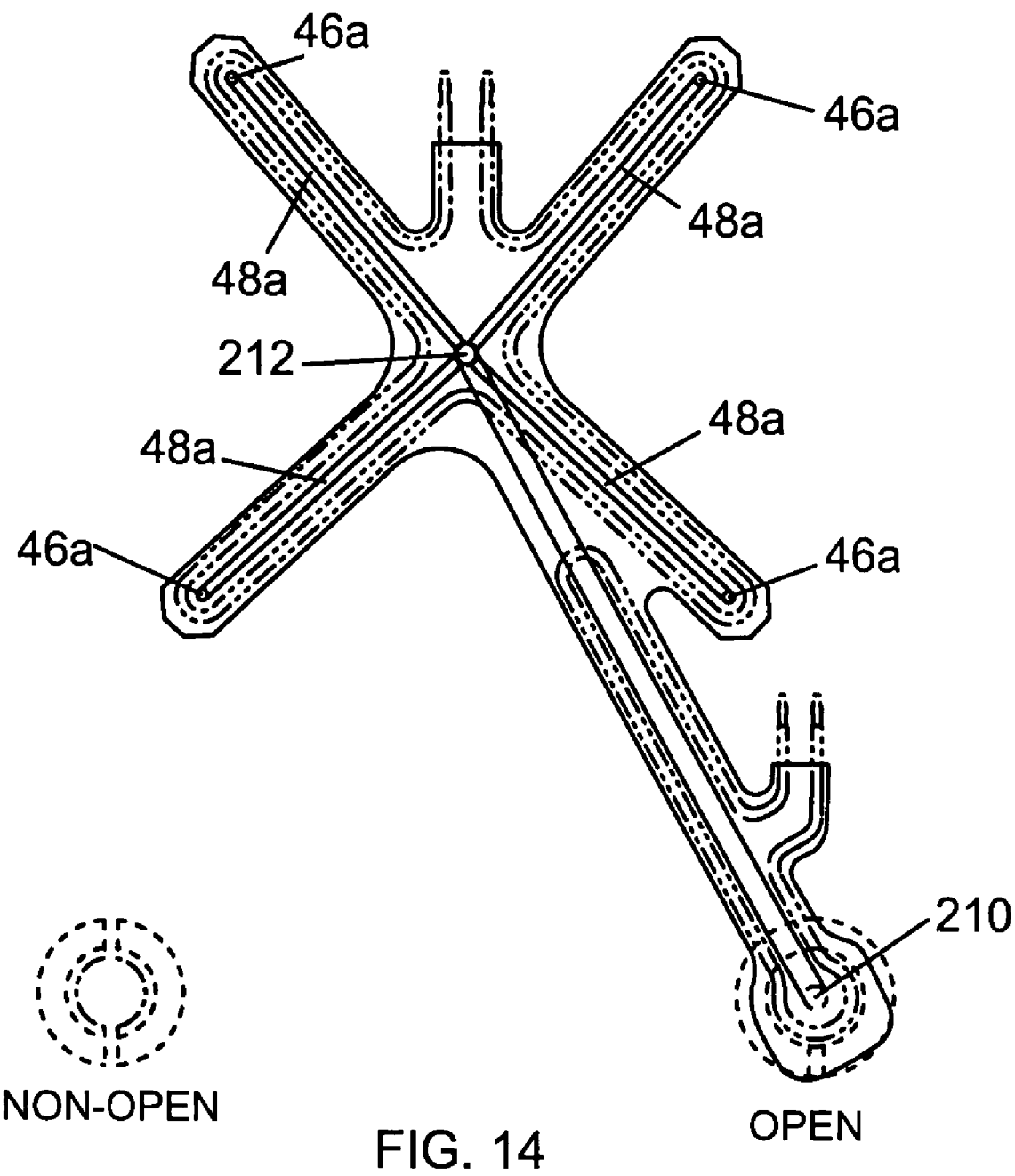
FIG. 14 is an end elevation schematically illustrating a second part of a first manifold assembly corresponding to the FIG. 2 arrangement.
Figure 15:
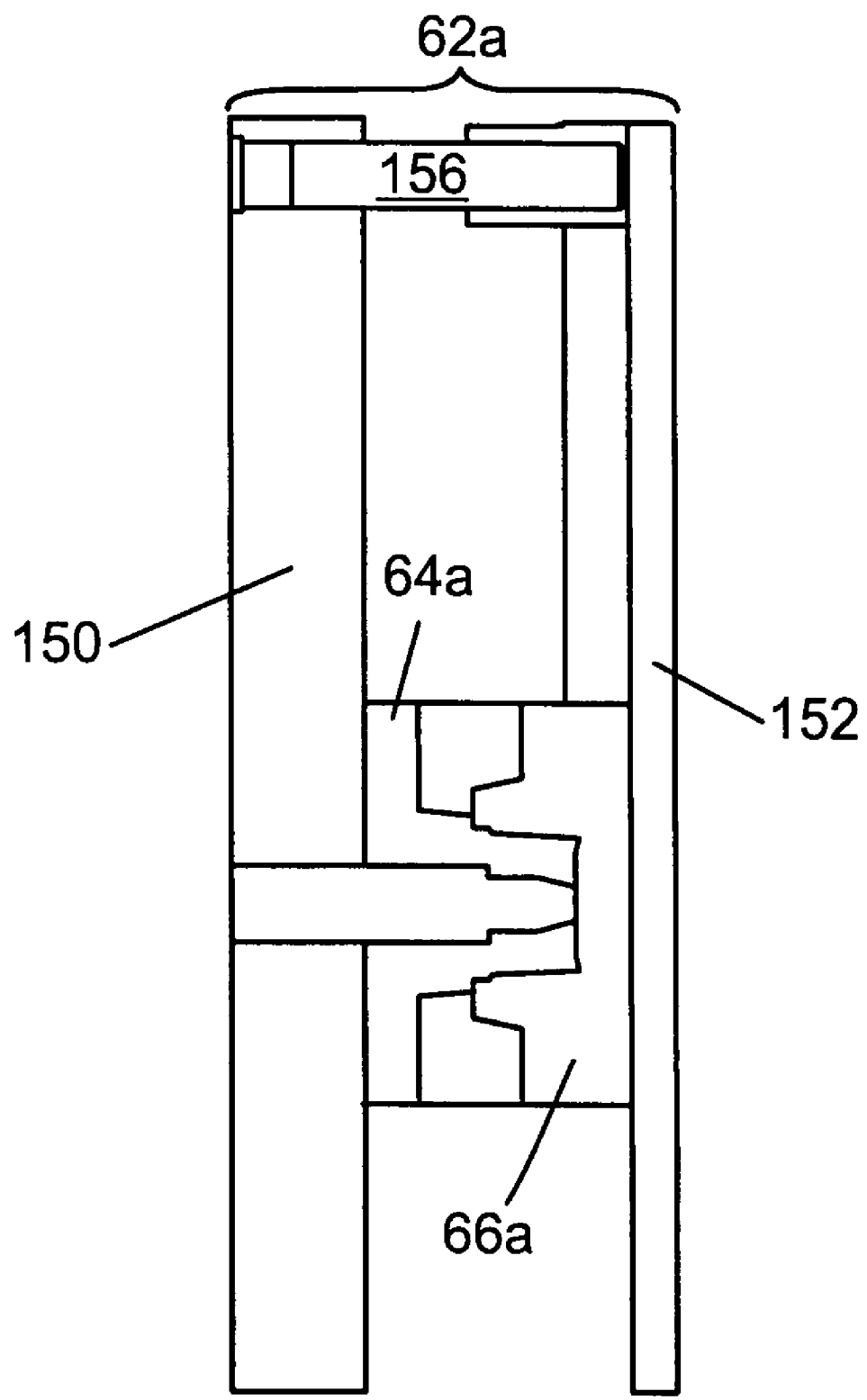
FIG. 15 is a front elevation of a stack module for valve gate hot runners.

The second manifold 42b is illustrated in FIG. 14. The second manifold 42b has a melt inlet 210 which receives melt from the first melt transfer conduit 202. The melt inlet 210 extends to and fluidly communicates with a central region 212 which in turn fluidly communicates with four radially extending passageways 48a which have respective outlets 46a, each of which serves a respective of the nozzles 52a.

It will be appreciated that the entire assembly of mold and manifold sets is of considerable weight, and accordingly would benefit from being slidably supported to assist in maintaining component alignment during mold opening and closing. One manner of slidably supporting the assembly 20 is illustrated in FIGS. 1, 2, 3, 5 and 16 in which the second manifold module 80 includes a slide 220 or other guide means for slidably supporting the second manifold module 80 on injection machine rails 230.

The second manifold 42b and the core part 64 of the first mold module 62 may in turn be secured to the second manifold module 80 thereby also being supported (through the second manifold module 80) by the slide 220. The second manifold module 80 may be further supported by a pair of guide shafts 240 extending therethrough toward the top and either side thereof. The guide shafts 240 may be secured at a first end 242 to a second frame member 250 secured to the movable platen 24 between the movable platen and second mold module 112. An opposite end 244 of the guide shaft 220 may be slidably received in a recess 246 extending into or through the first frame member 260. As mentioned above, the first frame member 260 is mounted to the fixed platen 22 between the fixed platen 22 and the first manifold module 40.

The guide shafts 240 maintain the assembly 20 together in alignment enabling the entire assembly 20 to be removed as a unit with the frame members 250 and 260.

In cases where there is no second part 40b to the first manifold module 40, such as illustrated in FIG. 1 where the first nozzle array 50 consists of hot tip nozzles 52, a spacer plate 270 may be used to take up the space which would otherwise be occupied by the second manifold part 40b to the first manifold module 40a and 40b. The spacer plate 270 may be attached to and supported by the second manifold module 80 as described above.

In cases such as illustrated in FIG. 2 where the first mold module 40 has a first part 40a and a second part 40b, the second part 40b may be secured to the second manifold module 80.

Figure 16:
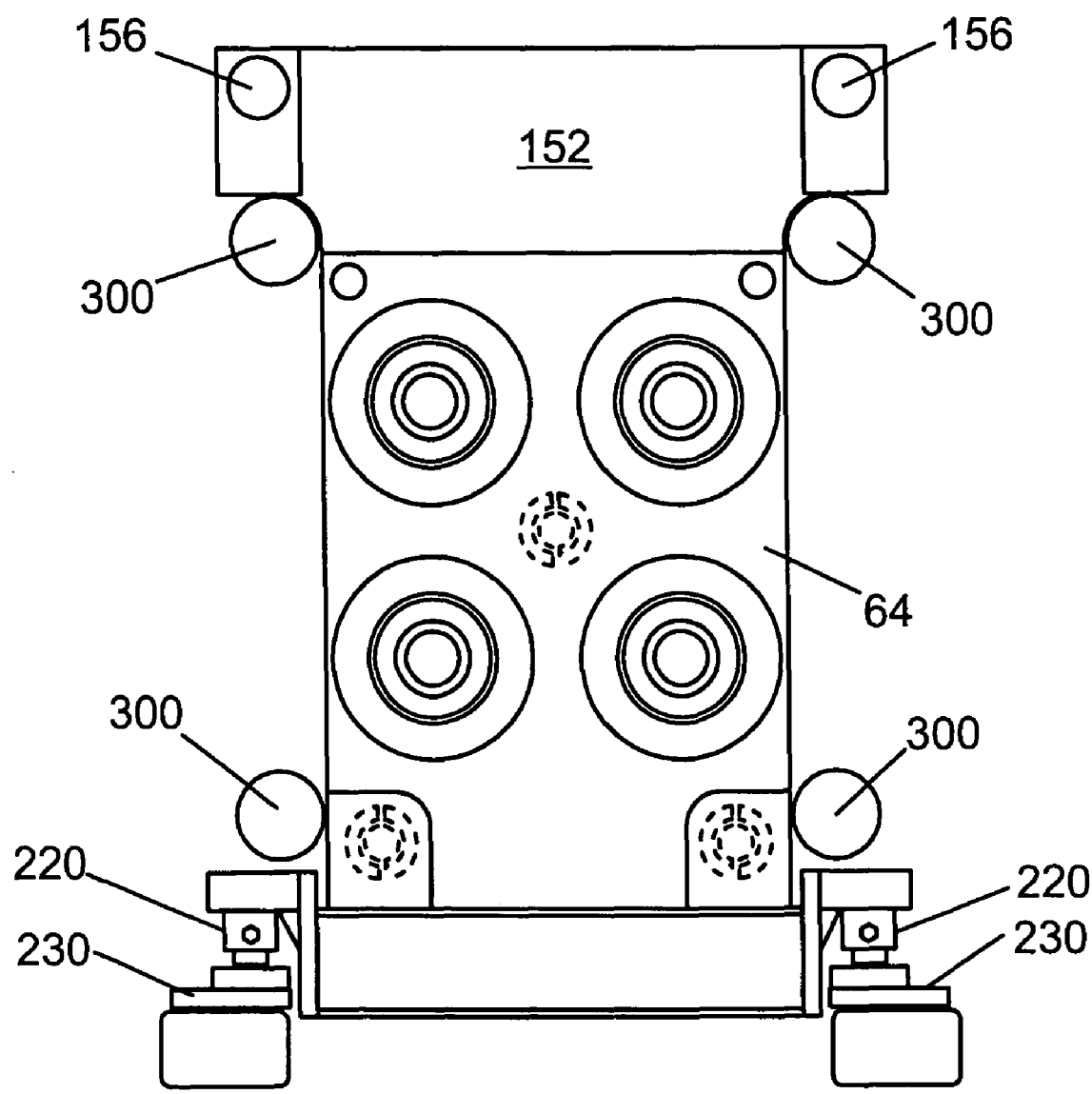
FIG. 16 is an end elevation of a center section with stack and frame modules installed.
Figure 17:
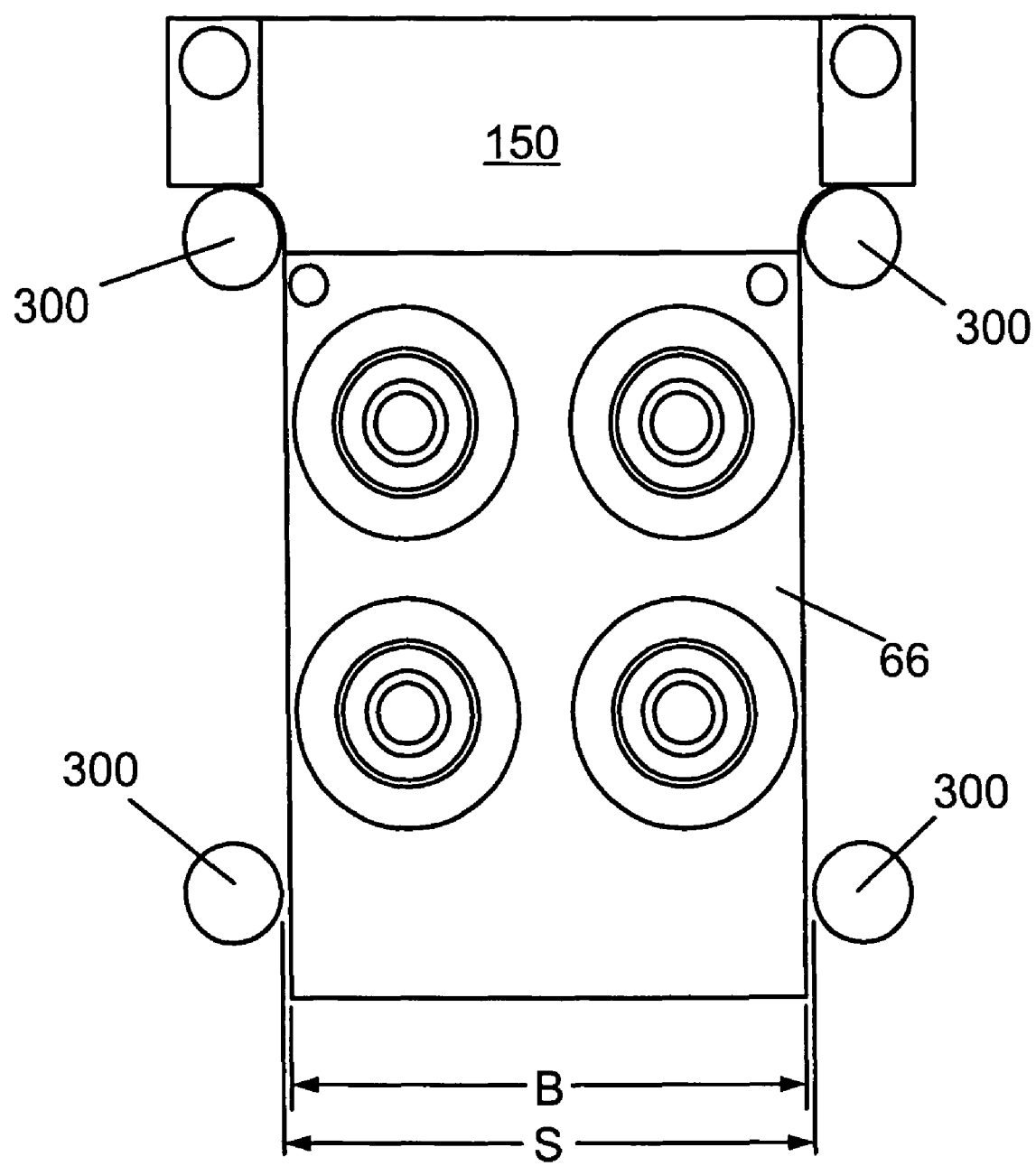
FIG. 17 is an end elevation illustrating a moving platen section with stack modules installed.

An injection molding machine typically has tie bars, such as illustrated by reference 300 in FIGS. 16 and 17, extending between the fixed platen 22 and movable platen 26. In order to facilitate removal from above, preferably the mold plates, such as the core plate 152 and the cavity plate 150 in FIG. 17 are dimensioned so as to have a breadth "B" less than the spacing "S" between the tie bars.

The above description is intended in an illustrative rather than a restrictive sense bearing in mind that variations to the specific embodiments described may be apparent to persons skilled in such apparatus and systems without departing from the inventive concept as defined by the claims set out below. For example, although the invention has been described in conjunction with a two-level mold, it may be adaptable to stack molds having more than two levels. In such an arrangement the second mold module 112 may be affixed to an intermediate number which in turn is connected to the movable platen by a centering device to effect mold opening and closing movement.

The illustrations show the second manifold module 112 in association with valve gated nozzles. It may alternatively have to be switched for a corresponding unit (along with the mold module) having hot tip nozzles.

The invention claimed is:

1. A modular injection mold and manifold arrangement for a multi-level stack mold assembly mountable between a stationary platen and a movable platen of an injection molding machine wherein said stationary platen has at least one sprue bushing providing at least first and second discrete melt sources, said arrangement comprising:
   a first manifold module mountable to said stationary platen and providing a first melt distribution conduit for receiving melt from said first discrete melt source and delivering only said melt from said first discrete melt source to a first nozzle array associated with a first mold level of said multi-level stack mold assembly;
   said first mold level including a first mold module having a first core part, a first cavity part for registering with said first core part and respective gates registering with each nozzle of said first nozzle array for injecting said melt into a space defined between said first core and cavity parts in a mold closed configuration;
   a second manifold module mountable between said stationary and movable platens for movement toward and away from said fixed platen and including a second melt delivery conduit for receiving melt from said second discrete melt source and delivering only said melt from said second discrete melt source to a second nozzle array associated with a second mold level of said multi-level stack mold assembly at least a portion of said second melt delivery conduit extends through said first manifold;
   said second mold level includes a second mold module having a second core part, a second cavity part for registering with said second core part and respective gates registering with each nozzle of said second nozzle array for injecting said melt into a space defined between said core and cavity parts in said mold closed configuration;
   said first and second core and cavity parts being separable in a machine direction to a mold open configuration for stripping and being connectable to said stationary and movable platens for movement between said mold open and mold closed configuration;
   said first and second manifold modules being configured to divert melt around rather than through said first mold module to facilitate exchange of said first mold module as a unit for a first mold module for a different part having corresponding gate positions;
   said first manifold module being disconnectable at said sprue bushing from said stationary platen to facilitate exchange of a given first manifold module for another first manifold module of different configuration for a different first mold module;
   said second manifold module receives melt from said second source through a second run of said second melt delivery conduit, which is separable along its length for mold opening and to allow exchange of said second manifold module for one of different configuration; and,
   said second mold module is removable from said second manifold module without disassembly of said second manifold module to allow exchange of one said second mold module for another configured for a different part but having corresponding gate positions.

2. The modular injection mold arrangement of claim 1 wherein:
   said first manifold module includes a first part having a first manifold and being securable to said fixed platen and a second part having a second manifold to which said nozzle array is affixed;
   said first mold module is mounted between said first and second parts; and,
   said first and second manifolds fluidly communicate through a first melt transfer conduit which forms part of said first melt delivery conduit and has a second crossover nozzle for allowing said transfer passage to separate during mold opening.

3. The modular injection mold and manifold arrangement of claim 2 wherein:
   said first nozzle array consists of valve gated nozzles; and
   said second nozzle array consists of one of valve gated and hot tip nozzles.

4. The modular injection mold and manifold arrangement of claim 2 wherein:
   said first manifold receives melt from said first and second melt sources;
   said first manifold has a first melt passageway which forms part of said first melt delivery conduit and provides fluid communication between said first melt source and said first melt transfer conduit;
   said first manifold has a second melt passageway which forms a first run of said second melt delivery conduit and provides fluid communication between said second melt source and said second run of said second melt delivery conduit; and
   said second manifold provides fluid communication between said first melt delivery conduit and said first nozzle array.

5. The modular injection mold and manifold arrangement of claim 4 wherein:
   said second manifold module includes a third manifold to which said second array of nozzles is affixed and which provides fluid communication between said second run of said second melt delivery conduit and said second nozzle array; and
   said second run of said melt delivery conduit includes a crossover nozzle for providing said separability along its length.

6. The modular injection mold and manifold arrangement of claim 1 wherein:
   said first manifold module has a first manifold secured to said fixed platen;
   said first nozzle array is affixed to said first manifold;
   said first nozzle array consists of hot tip nozzles;
   said first manifold has a first melt passageway providing fluid communication between said first melt source and said first nozzle array;
   said first manifold includes a second melt passageway which acts as a first run of said second melt delivery conduit for providing fluid communication between said second melt source and said second run of said melt delivery conduit.

7. The modular injection mold and manifold arrangement of claim 6 wherein:
   said second nozzle array consists of one of valve gated nozzles and hot tip nozzles;

said second manifold module includes a third manifold to which said second nozzle array is affixed;

said second manifold module includes guide means for slidably mounting said second manifold module to injection machine rails for slidably supporting said second manifold module during mold opening and closing;

said core part of said first mold module is secured to said second manifold module by a spacer plate extending therebetween;

support pins extend from said spacer plate through and slidably engage said first core and cavity parts to align said first core and cavity parts;

said first mold module and said spacer plate are dimensioned for withdrawal between tie bars extending between said stationary and movable platens for exchange with corresponding components configured for molding a different injection molded part.

8. The module injection mold and manifold arrangement of claim 7 wherein:

said first manifold module as well as said first mold module and spacer plate are dimensioned for withdrawal between said tie bars as a unit for exchange with at least a first mold module and a first manifold module configured for molding a different injection molded part.

9. The modular injection mold and manifold arrangement of claim 5 wherein:

said second manifold module includes guide means for slidably mounting said second manifold module to injection machine rails for slidably supporting said second manifold module during mold opening and closing;

said second part of said first manifold module is secured to said second manifold module and supported thereby;

support pins extend from said second part of said first manifold module through and slidably engage said first core and cavity parts to align said first core and cavity parts; and, said first mold module and at least said first part of said first manifold module are dimensioned for withdrawal between tie bars extending between said stationary and movable platens for exchange with corresponding components configured to form a different injection molded part.

10. A modular injection mold and manifold arrangement for a multi-level stack mold assembly mountable between a stationary platen and a movable platen of an injection molding machine comprising:

a first mold level including:
a first manifold module;
a first nozzle array;
a first mold module; and
a first melt distribution conduit configured to direct melt from only a first discrete melt source to the first nozzle array of the first manifold module; and a second mold level including:
a second manifold module;
a second nozzle array;
a second mold module; and
a second melt distribution conduit configured to direct melt from only a second discrete melt source to the second nozzle array of the second manifold module;

wherein the first melt distribution conduit and the second melt distribution conduit are distinct such that melt is not intermixed therebetween and thus melt directed by the first melt distribution conduit is not directed to the second nozzle array and melt directed by the second melt distribution conduit is not directed to the first nozzle array;

wherein the second melt distribution conduit is longer than the first melt distribution conduit; and wherein the second melt distribution conduit passes through the first manifold module.

11. The modular injection mold and manifold arrangement of claim 10, wherein the first mold level is exchangeable between a hot tip nozzle arrangement and a valve gated nozzle arrangement without modifying the second mold level.

12. The modular injection mold and manifold arrangement of claim 10, wherein the second mold module is exchangeable with a different second mold module without modifying the second manifold module.

13. The modular injection mold and manifold arrangement of claim 10, wherein the first manifold module includes a first inlet in discrete cooperation with the first melt source and a second inlet in discrete cooperation with the second melt source.

14. The modular injection mold and manifold arrangement of claim 13, wherein the first inlet is in fluid cooperation with nozzles of the first nozzle array and the second inlet is in fluid cooperation with nozzles of the second nozzle array.

15. A modular injection mold and manifold arrangement for a multi-level stack mold assembly mountable between a stationary platen and a movable platen of an injection molding machine comprising:

a first manifold module of a first mold level that is mountable to the stationary platen and includes a first discrete melt distribution conduit for directing only melt from a first discrete melt source to a first nozzle array associated with a first mold module; and a second manifold module of a second mold level that is mountable between the stationary and movable platens for movement toward and away from the fixed platen and including a second discrete melt distribution conduit for directing only melt from a second discrete melt source, around the first mold module, and to a second nozzle array associated with a second mold module;

wherein a portion of the second discrete melt distribution conduit passes through the first manifold module; and wherein the first discrete melt distribution conduit is shorter than the second discrete melt distribution conduit.

16. The modular injection mold and manifold arrangement of claim 15, wherein the first manifold module is disconnectable from the stationary platen at a sprue bushing to facilitate exchange of the first manifold module for a another first manifold module having a different configuration for operation with a another first mold module that is different from the first mold module.

17. The modular injection mold and manifold arrangement of claim 15, wherein the second mold module is removable from the second manifold module without disassembly of the second manifold module to allow exchange of the second mold module for another second mold module configured for a different part and having corresponding gate positions.

18. The modular injection mold and manifold arrangement of claim 15, wherein the first nozzle array consists of valve gated nozzles and the second nozzle array consists of one of valve gated nozzles and hot tip nozzles.

19. The modular injection mold and manifold arrangement of claim 15, wherein the first melt and the second melt have different compositions.

* * * * *